US007653344B1

(12) United States Patent
Feldman et al.

(10) Patent No.: US 7,653,344 B1
(45) Date of Patent: Jan. 26, 2010

(54) WIRELESS DIGITAL AUDIO/VIDEO PLAYBACK SYSTEM

(75) Inventors: Theodore Philip Feldman, San Francisco, CA (US); David Andrew Rice, Syracuse, NY (US)

(73) Assignee: Neosonik, San Francisco, CA (US)

( * ) Notice: Subject to any disclaimer, the term of this patent is extended or adjusted under 35 U.S.C. 154(b) by 734 days.

(21) Appl. No.: 11/030,694

(22) Filed: Jan. 5, 2005

Related U.S. Application Data

(60) Provisional application No. 60/535,457, filed on Jan. 9, 2004, provisional application No. 60/535,251, filed on Jan. 9, 2004.

(51) Int. Cl.
*H04H 40/00* (2008.01)
*H04B 7/00* (2006.01)

(52) U.S. Cl. ........................ 455/3.06; 455/41.3; 725/81

(58) Field of Classification Search ................ 455/3.06, 455/11.1, 41.1, 41.2, 41.3; 84/601-602, 84/609-610; 375/141, E7.019-7.025, 146, 375/147; 381/75, 79, 82, 78, 81, 85, 109; 725/82, 85, 109
See application file for complete search history.

(56) References Cited

U.S. PATENT DOCUMENTS 5,822,440 A * 10/1998 Oltman et al. ................ 381/82
5,946,343 A * 8/1999 Schotz et al. ............... 375/141
6,864,413 B2 * 3/2005 Shiiya, Yoshihiro .......... 84/610
7,034,891 B2 * 4/2006 Joung et al. ................. 348/565
7,150,032 B1 * 12/2006 Sadanaka et al. .............. 725/80
2003/0135860 A1 * 7/2003 Dureau ........................ 725/82
2003/0172798 A1 * 9/2003 Fujiwara et al. ............... 84/609

* cited by examiner

*Primary Examiner*—Quochien B Vuong
(74) *Attorney, Agent, or Firm*—Fenwick & West LLP

(57) ABSTRACT

The present invention discloses methods and systems for providing very high quality audio and video playback using all-digital wireless paths from the source to the speaker transducers, video displays and headphones located anywhere within a distance allowed by the FCC. Each speaker has a separate digital amplifier dedicated to each transducer within it (e.g. woofer, tweeter). The present invention also discloses a system that provides a data link capable of sending an all-digital, full-bandwidth, signal from the original digital source material to each separate transducer in the system without using sound degrading lossy data compression. This system is designed to read, broadcast, and reproduce with accurate audio loudspeaker time-alignment (<100 uS) and low overall latency (less than 7 milliseconds) all popular audio and video formats in full-bandwidth and without data compression in the effort to maintain the integrity of the entire audio and video signal.

10 Claims, 4 Drawing Sheets

WIRELESS DIGITAL AUDIO/VIDEO PLAYBACK SYSTEM

CROSS REFERENCE TO RELATED APPLICATIONS

This application claims the benefit of U.S. Provisional Applications No. 60/535,457 and 60/535,251 filed on Jan. 9, 2004, both of which are hereby incorporated herein by reference in their entirety.

BACKGROUND

1. Field of the Invention

The present invention relates in general to video and audio playback systems and in particular to methods and systems for playing audio and video from a digital source, wirelessly transferring the source data to a video display or projector and a set of digital powered speakers.

2. Background of the Related Art

Many systems are available to provide high quality playback of video and audio. Most of the systems that currently provide the highest quality of playback are built by individuals from off-the-shelf components (amplifiers, speakers, DVD/CD players).

It is widely recognized that loudspeakers provide the best sound quality when driven by multiple amplifiers. It is a typical "audiophile" practice to use separate monoblock amplifiers to drive a loudspeaker pair because it results in superior fidelity.

These amplifiers typically have separate transformers and larger power supplies, thus making it easier for each amplifier to drive an individual loudspeaker rather than a stereo pair.

Some audiophiles take this practice a step further, by using a separate monoblock amplifier for each individual transducer—meaning a pair of 3-way loudspeakers would be driven by (6) separate monoblock amplifiers. With such an arrangement, an electronic crossover may be necessary to create a uniform frequency response. This electronic crossover may eliminate the need for a passive crossover network in the loudspeaker, thus enabling the designer to experiment with steeper crossover slopes and greater frequency response correction. Designers of high-resolution loudspeakers have always been plagued by the fact that they cannot predict what kind of amplifier will be used to drive their design. In fact, of all the links in the audio chain, it is the interaction between amplifier and loudspeaker that has the greatest impact on fidelity.

Unfortunately, in the world of high-end audio, multiple amplifiers and electronic crossovers can be incredibly expensive. In addition, overall resolution can be lost if low-grade parts are used in the electronic crossover. The high cost of building such a system has severely limited its market potential. Thus, there is a need for a system that provides the crossover function and capability to tune each amplifier and speaker combination so that a manufacturer can achieve extremely high fidelity performance with relatively inexpensive parts.

One common source of trouble in existing systems is that the amplifiers must be connected to the speakers by fairly long lengths of wire, which adds additional impedance mismatches, frequency response roll-off and added distortion to the speaker system. Furthermore, the separate amplifiers are typically driven with analog audio sources, which means that it is necessary to use amplifiers with similar current and distortion characteristics in order to maintain a similar seamless sonic integration between speaker channels as well as between transducers in each speaker. Consequently, it is very difficult to mix and match different amplifier types or topologies within a loudspeaker configuration, such as a tube amplifier to drive a tweeter and a solid-state class a/b amplifier to drive a woofer. Additionally, the crossover networks are typically constructed from analog audio filters or digital filters with analog inputs and outputs. Analog level crossover networks are another primary source of signal degradation and distortion caused by the quality of components used in either a passive or electronic analog crossover, i.e. non-inductive wire-wound resistors sound better and produce less distortion than a typical sand-cast resistor, and film/foil polypropylene capacitors sound significantly better than mylar or electrolytic capacitors. Up until now, there has been no system that provides a completely digital path from the source (CD or DVD player) to the speaker transducers, while also eliminating all analog components from the signal path.

An additional difficulty arises when installing a multichannel (surround) system, in that long wires must be run to each speaker. While this can be easily accomplished when the room is being built, the majority of systems are being installed in existing homes. Even when the physical running of the wires is not a problem, degradation of sound quality always takes place whenever an analog audio signal is transmitted down a conductor, regardless of whether gold, silver, copper or even exotic materials like carbon fiber are used. The audio cable industry has spent significant amounts of money developing new and purer conductive materials, such as "6-nines" copper (99.9999% pure) and experimented with a wide array of cable construction techniques and dielectrics such as teflon in the effort to reduce impedance mismatches, ringing, distortion, and smearing or roll-off of the audio signal's frequency response before it travels down a conductor to the next audio component.

To date, most of the work done to implement wireless video has done little to address the need for high quality reproduction of the sound portion of the programming. These systems have concentrated on replacing just the video link, or simply pass a compressed and degraded version of the audio over the link to a conventional amplifier/speaker system, using a single point-to-point data link for both video and audio. Thus, there is a need for a system that separates the channels to the video and individual speakers, providing enhanced flexibility in speaker placement and eliminating much more of the conventional systems wiring.

The rise of CD, DVD and the Internet has largely supplanted analog source material as the primary playback medium. Music and video signals are now most commonly distributed to consumers in digital formats. Thus, there is a need for a system that can provide an all-digital path from the digital source to the speaker transducer so that the audio can be delivered in as close to the original form as possible.

SUMMARY

The present invention provides a method and an apparatus for providing very high quality audio and video playback using all-digital paths from the source to the speaker transducers and video display, including a digital wireless link to connect the source controller to the speakers and video display. The apparatus is a wireless digital audio and video playback system and comprises: a controller unit, which accepts a digital or analog audio input, or optionally includes a DVD/CD drive, HD-DVD or Blu-ray drive, and generates a digitally encoded RF signal; a wireless video receiver which includes an RF receiver for decoding the digital RF signal, and either an output to a standard video monitor or projector, or an integrated video monitor or projector; and one or more wireless speaker units, each speaker unit including an RF receiver, a digital crossover, one or more amplifiers and one or more speaker transducers. Due to its integrated nature, the apparatus provides better performance and lower cost than existing systems.

In one embodiment of the present invention, a digital wireless playback apparatus includes: at least one signal source; a controller for receiving at least one input signal from at least one signal source and broadcasting an output digital signal; and one or more wireless digital devices for receiving the output digital signal.

In another embodiment of the present invention, a controller for broadcasting a digital signal includes: a digital signal processor for processing an input digital signal; an encoder for generating a digital bitstream in a native format of the input digital signal; an RF transmitter for modulating the digital bitstream; and an antenna for broadcasting the digital bitstream.

In still another embodiment of the present invention, a wireless video receiver includes: at least one antenna for receiving a digital broadcast signal; at least one RF receiver for demodulating the digital broadcast signal to produce a digital bitstream; and a digital decoder for decoding the digital bitstream in a video and an audio signal.

In yet another embodiment of the present invention, a digital wireless speaker includes: at least one antenna for receiving a digital broadcast signal; at least one RF receiver for demodulating the digital broadcast signal to produce a digital bitstream; a digital signal processor for processing the digital bitstream; one or more amplifiers for receiving one or more digital audio signals from the digital signal processor, respectively; and one or more transducers coupled to the one or more amplifiers, respectively.

In further another embodiment of the present invention, a method for playing a speaker via wireless digital transmission includes steps of: receiving an input digital signal; processing the input digital signal via a first digital signal processor; broadcasting the processed digital signal via a sending antenna; receiving the broadcast digital signal via a set of receiving antennas at the speaker, the broadcast digital signal including a bitstream in a native format of the input digital signal; processing the received digital signal via a second digital signal processor; sending a set of digital audio signals to a set of transducers of the speaker, respectively.

These and other advantages and features of the invention will become apparent to those persons skilled in the art upon reading the details of the invention as more fully described below.

DETAILED DESCRIPTION

Before the present systems and methods are described, it is to be understood that this invention is not limited to particular data, software, hardware or method steps described, as such may, of course, vary. It is also to be understood that the terminology used herein is for the purpose of describing particular embodiments only, and is not intended to be limiting, since the scope of the present invention will be limited only by the appended claims.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described.

It must be noted that as used herein and in the appended claims, the singular forms “a”, “an”, and “the” include plural referents unless the context clearly dictates otherwise. Thus, for example, reference to “a amplifier” includes a plurality of such amplifiers and equivalents thereof known to those skilled in the art, and so forth.

The present invention takes multiple amplifiers per speaker approach as a starting point, but, in contrast to the existing systems, integrates the multiple amplifiers and speaker drivers into a single unit, so that the performance of the speakers in this system will be vastly superior to prior solutions. The use of integrated digital signal processors (DSP’s) in the present invention to provide the crossover function and to tune each amplifier and speaker combination, allows the manufacturer to achieve extremely high fidelity performance with relatively inexpensive parts. One of the major benefits of this approach is that each speaker and its included amplifiers can be tuned as a system, and the tuning information can be store by the on-board DSP in a non-volatile memory, making each manufactured unit perform with the same high level of fidelity. In addition, by separating the channels to the video and individual speakers, the present invention provides much better flexibility in speaker placement and eliminates much more of the systems wiring.

Unlike the existing few attempts at doing wireless audio that primarily focused on wireless technology, the present invention’s combination of digital input, digital wireless transmission, digital crossover and filtering, and digital (preferably, class D) amplification provides much higher quality sound than has been achieved to date. Also, combining both audio and video data in the same broadcast stream may allow for better control of the system, providing improvements in the ability to synchronize the audio and video over separate wireless approaches.

Figure 1:
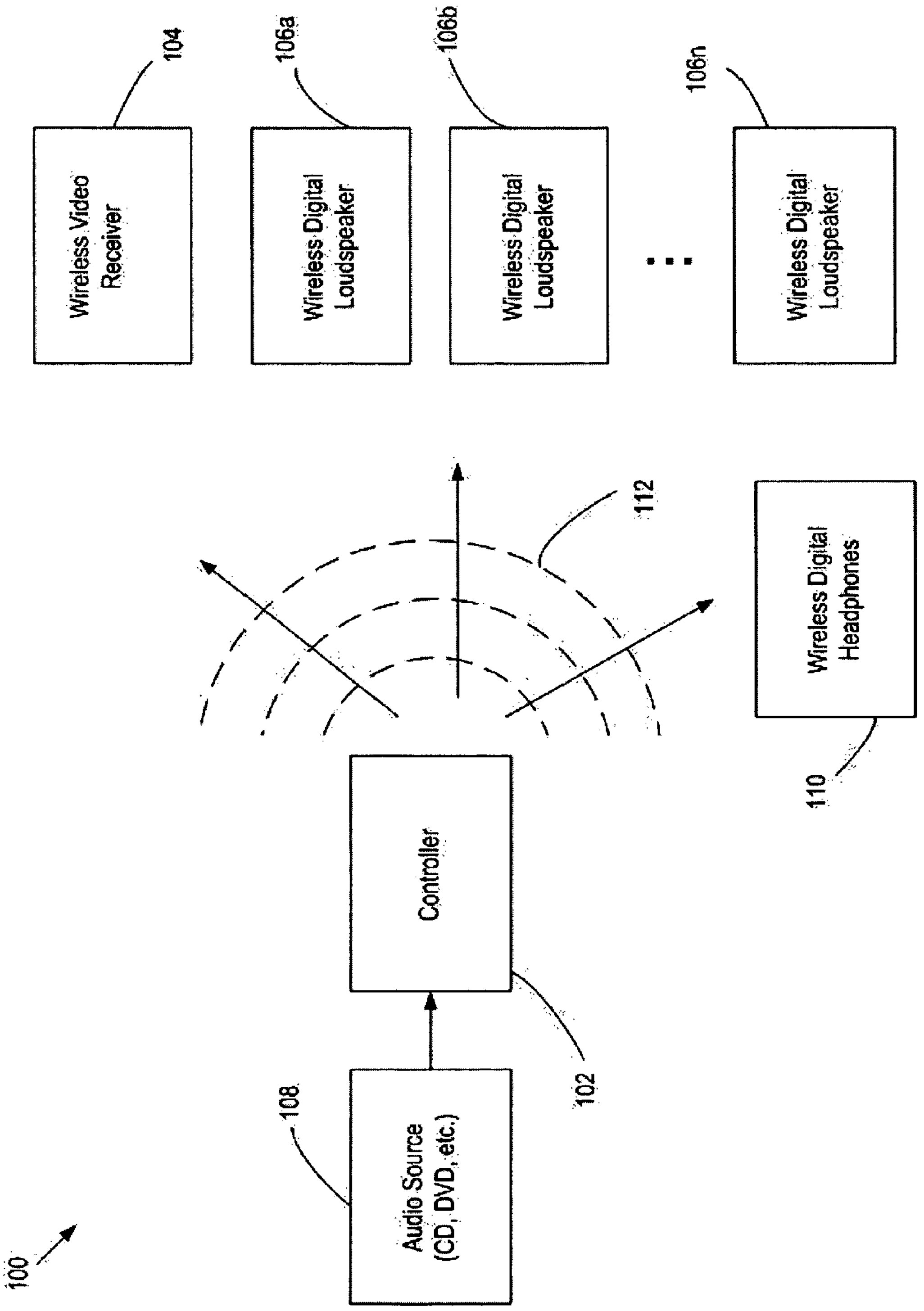
FIG. 1 is a schematic diagram of a digital wireless playback apparatus, according to one embodiment of the present invention.

FIG. 1 is a schematic diagram of a digital wireless playback apparatus 100, according to one embodiment of the present invention. The apparatus 100 comprises: a controller 102, a wireless video receiver 104, one or more wireless digital loudspeakers 106*a-n*, and optionally a wireless digital headphone 110. In one embodiment, the controller 102 may connect via a cable to an audio source 108. In another embodiment, the audio source 108 may be integrated into the controller 102. The controller 102 may communicate the source data received from the audio source 108 to the video receiver 104, the one or more wireless digital loudspeakers 106*a-n*, and/or the digital headphone 110 via a wireless transmission 112. For clarity illustration, only one wireless video receiver 104 and one wireless digital headphone 110 are shown in FIG. 1. However, it should be apparent to those of ordinary skill that the present invention can be practiced with any number of wireless video receivers and wireless digital headphones.

Figure 2:
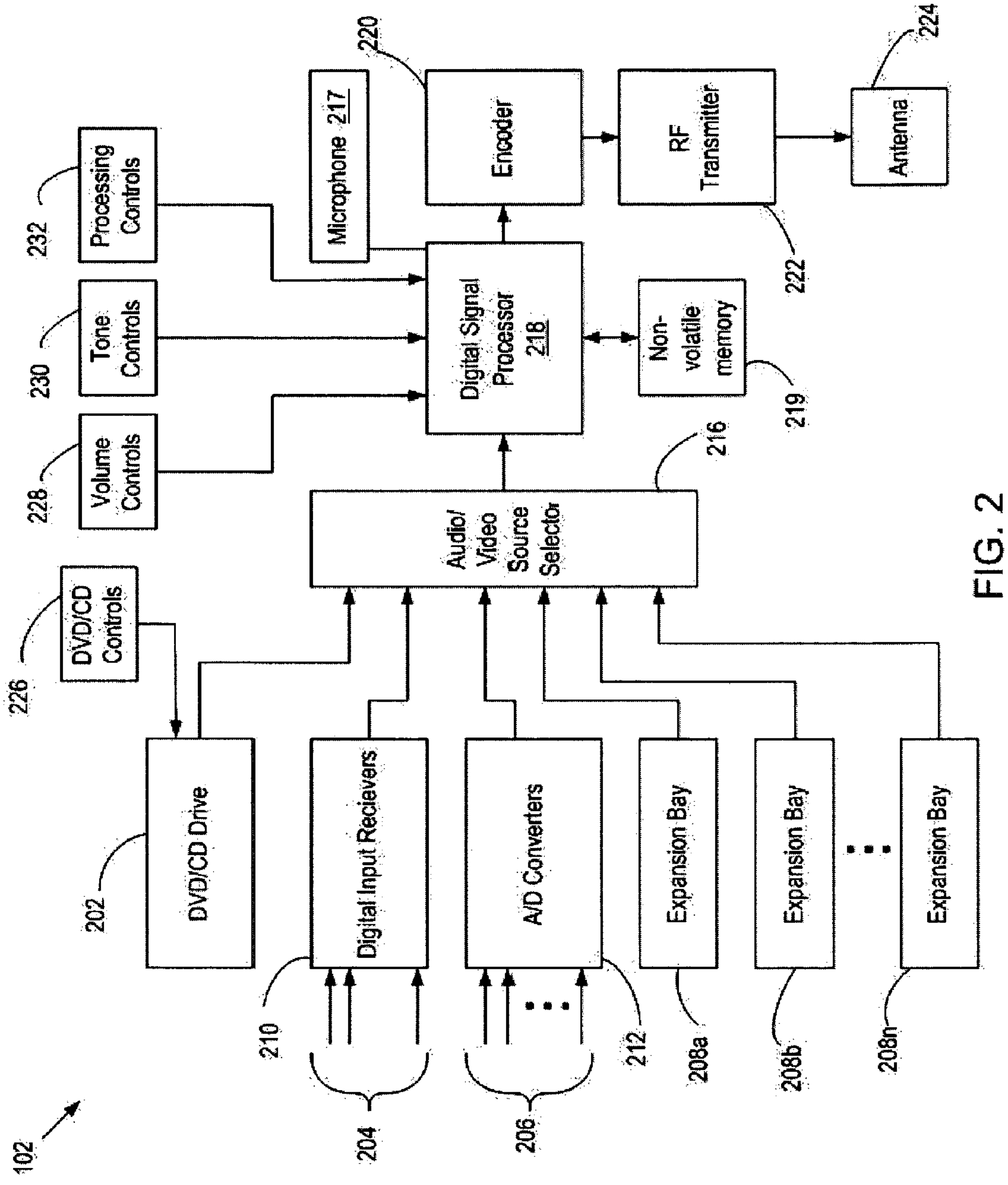
FIG. 2 is a schematic diagram of the controller shown in FIG. 1.

FIG. 2 is a schematic diagram of the controller 102 shown in FIG. 1. As illustrated in FIG. 2, the controller 102 comprises: a DVD drive or like distribution media replay mechanism 202; one or more digital input receivers 210 for receiving one or more digital inputs 204; one or more A/D converters 212 for receiving one or more analogue inputs 206 and converting into digital signals; one or more internal modular expansion slots 208 for adding additional source capabilities such as a cable, satellite or terrestrial TV and HDTV tuner, an analog or digital AM/FM radio, satellite radio, an ethernet port for streaming audio and video over the internet, a hard disk drive that can store and playback digital audio and video files, or other digital sources; an audio/video source selector 216 for selecting one from multiple inputs; a digital signal processor 218 for processing the selected signal; an encoder 220 for encoding output signal from the DSP 218; a RF transmitter 222; and a sending antenna 224. The controller 102 may optionally accept and process digital music formats like CD, DVD, MP3 and Internet streaming, along with high-resolution formats like Super Audio Compact Disk (SACD) and DVD-A. Optionally, it may also accept surround sound formats such as from Dolby, THX and Digital Theater Systems (DTS).

The digital audio inputs 204 may enable additional digital sources such as Digital TV and HDTV and Digital Audio Tape (DAT) to be played by the apparatus 100 without extra digital-to-analog (D/A) conversion. These inputs may be routed through the controller's digital audio receivers 210. The analog audio inputs 206 may accept analog sources such as record players, VCRs and/or tape decks and may be routed through the controller's internal A/D converter 206. Digital and analog video inputs may enable a variety of video sources to be switched by the controller 102 and broadcast to a video monitor within range that is equipped with a wireless video receiver 104.

An audio/video source selector 216 may control which of the inputs are provided to the digital signal processor (DSP) 218. In one embodiment, this function may be performed in a field programmable gate array (FPGA) or application specific integrated circuit (ASIC). In another embodiment, this function can be implemented by any of a number of multiplexing circuits, such as analog multiplexer IC's, digital multiplexer IC's, combinations of discrete digital logic, or even simple relay or mechanical switches.

The controller 102 may take the digital source material and perform a variety of audio functions such as volume control, equalization (digital bass & treble, etc. controls as well as optional room correction) and/or surround sound processing in the digital domain via the DSP 218. The DSP 218 may determine if the signal is stereo or surround sound, perform the desired audio processing, and prepare the data for transmission. A digital encoder 220 may create a digital bitstream that combines the data of all of the music and video channels of the processed source material.

The encoder 220 may send the encoded bitstream to the RF transmitter 222, which modulates the data onto an RF signal. The RF signal may be then transmitted through antenna 224. This multi-channel wireless broadcast from the antenna 224 may distribute digital audio and video data to a closed network of loudspeakers, headphones and video monitors. In a representative embodiment of the present teachings, in order to broadcast all popular audio and video formats in full-bandwidth without compression, the wireless system's bandwidth capability may exceed 35 Mbps. In an alternative embodiment, lossless compression algorithms may be used to reduce this bandwidth without degradation, or lossy compression may be used if the degradation of the audio and/or video quality can be tolerated.

The controller 102 may broadcast signals within the constraints of federal communications commission (FCC) rules as far as 90 meters, thus giving it the ability to transmit to speakers and video monitors throughout a user's home or facility. The wireless bandwidth may be divided into separate broadcast channels, meaning the controller 102 may broadcast different sources to different loudspeakers, or headphones, throughout the user's home or facility. The primary limitation on the number and variety of sources broadcast may be the overall system bandwidth.

Various other controls may be included in controller 102. Such controls may include volume controls 228, tone controls 230, processing controls 232, and DVD/CD controls 226. These controls are optional as the controller 102 could be built with no controls, relying on the source programming to control volume, etc. The source programming may be stored in the DSP 218 and/or non-volatile memory 219.

It is noted that the controller 102 may broadcast a RF digital bitstream that may have the native format of its signal input source and be either a multicast (or, equivalently, aggregate) data stream which contains all of the audio and video data and received by each node in the network which then strips out its required signal (such as left front speaker, or video monitor, or subwoofer channel) from the aggregate data stream, or a so called point-to-multipoint stream where each data stream may be sent directly to its destination and is acknowledged by that destination. In contrast to the conventional systems, the bitstream from the controller 102 is not compressed or buffered, which preserves the original quality of the input signal. Also, the video and audio signals carried in the bitstream can be separated and displayed simultaneously by the receiving devices, such as the wireless video receiver 104, digital loudspeakers 106*a-n* and wireless digital headphones 110.

The controller 102 may receive video/audio signals in various formats. In one embodiment, the audio formats may include CD, MP3, DVD-A, SACD, 24 bit/96 kHz recordings and any other high-bandwidth recording format. In another embodiment, video formats may include NTSC, DVD, all THX formats, all Dolby Surround formats, all DTS formats and all HDTV formats and any other high-bandwidth video recording format.

Because the systems response can be altered by the acoustics of the room in which the loudspeakers 106*a-n* are operating, the controller 102 may use a microphone 217 coupled to the DSP 218 which creates a method for measuring and correcting these anomalies. The DSP 218 generates a series of test tones that are played back by each of the loudspeakers 106*a-n*. The microphone 217 measures the response for each loudspeaker in that particular room and sends this data back to the DSP 218. The DSP 218 calculates a new frequency response correction curve for each loudspeaker that reduces these room anomalies and stores this data in the non-volatile memory 219. After this correction routine has been accomplished, each loudspeaker reproduces a new frequency response curve that has been adjusted from the original factory setting to incorporate any frequency response anomalies presented by that particular room.

Figure 3:
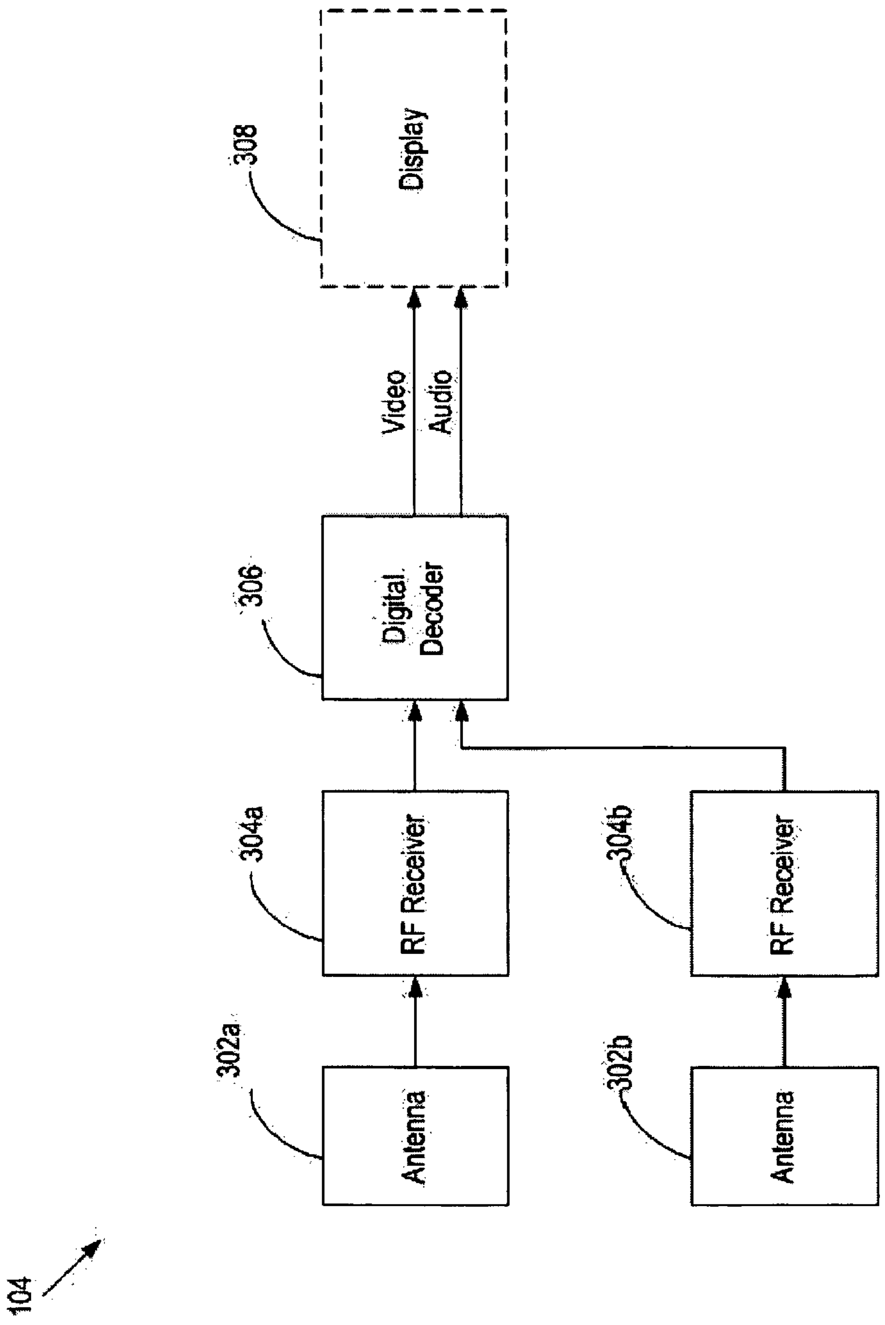
FIG. 3 is a schematic diagram of a high-bandwidth wireless video receiver shown in FIG. 1.

Referring now to FIG. 3, a schematic diagram of the high-bandwidth wireless video receiver 104 is illustrated in accordance with one embodiment of the present invention. The video receiver 104 may be designed to capture the RF video signal broadcast from the antenna 224. The video receiver 104 may be built into any kind of TV receiver or monitor, such as plasma and other flat-screen monitors as well as digital light processing (DLP), liquid crystal display (LCD) and cathode ray tube (CRT) Projectors, or it can be a separate unit that connects to a standard commercially available display or projector. In a preferred embodiment of the present invention, the video receiver 104 may receive video signals at full-bandwidth, including national television systems committee (NTSC), digital versatile disk (DVD), and high definition television (HDTV) in all international formats. In this embodiment, the received RF video signal may have the native format of the original input to the controller 102 and not compressed or buffered to prevent the degradation of the video/audio quality. In an alternative embodiment of the present invention, lossless compression algorithms may be used to reduce this bandwidth without degradation, or lossy compression may be used if the degradation of the audio and/or video quality can be tolerated. The video receiver 104 may comprise one or more receiving antennas 302*a-b*, one or more RF receivers 304*a-b*, a decoder 306, and an optional display 308. In one embodiment, the display 308 may not be included in the video receiver 104 and an output such as a digital video input (DVI) or high definition multimedia interface (HDMI) format output signal may be provided to drive external displays or projectors. For clarity of illustration, only two antennas 302*a-b* and two RF receivers 304*a-b* are shown in FIG. 3. However, it should be apparent to those of ordinary skill that the present invention may be practiced with any number of antennas and RF receivers.

The antennas 302*a-b* may receive the encoded RF signal and pass the signal to the RF receivers 304*a-b*, respectively. Each RF receiver 304 may demodulate the RF signal to produce a digital bitstream that is a reproduction of the transmitted bitstream in the controller 102. In many cases, a single receiver may be sufficient, but for better immunity to multipath, spatial diversity may be used, comprising multiple antennas 302*a-b* and receivers 304*a-b*. The bitstream output by the RF receivers 304 may be passed to the decoder 306 which may select the best stream at any point in time and decode the bitstream into a digital video bitstream. The decoder 306 may strip off the audio channels and discard them, or it may provide audio data streams for integrated speakers in the video monitor or projector.

Figure 4:
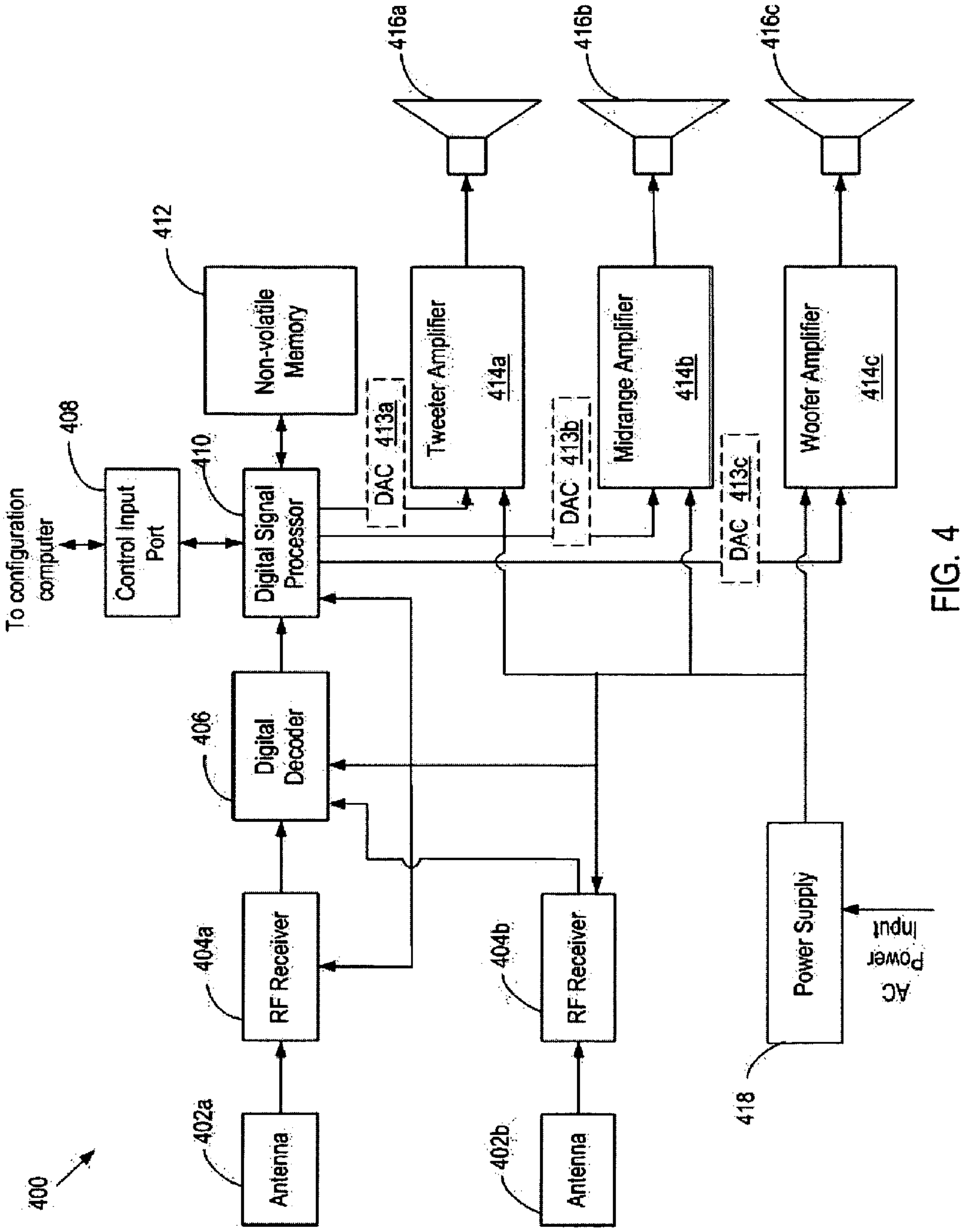
FIG. 4 is a schematic diagram of one embodiment of the wireless digital loudspeaker shown in FIG. 1.

FIG. 4 is a schematic diagram of one embodiment 400 of the wireless digital loudspeaker 106 shown in FIG. 1. The digital loudspeaker 400 may comprises: one or more receiving antennas 402*a-b*; one or more RF receivers 404*a-b*; a digital decoder 406; a digital signal processor 410; a non-volatile memory 412 coupled to the digital signal processor 410; one or more amplifiers including a tweeter amplifier 414*a*, a midrange amplifier 414*b* and a woofer amplifier 414*c*; one or more speaker transducers 416 coupled to the amplifiers 414 *a-c*, respectively; and one or more power supplies 418. For simplicity, only three sets of amplifiers 414*a-c* and transducers 416*a-c* are shown in FIG. 4. However, it should be apparent to those of ordinary skill that the loudspeaker 400 may have any number of amplifiers and transducers without deviating from the present teachings.

As in the wireless video receiver 104, the wireless loudspeaker 400 may use spatial diversity for providing continuous service in the presence of multipath. To this end, the loudspeaker 106 may include one or more antennas 402*a-b* and RF receivers 404*a-b*. The output of each RF receiver 404 may be a bitstream that mirrors the bitstream encoded by the encoder 220. In one embodiment of the present invention, the bitstream may be in a native format of the original input to the controller 102 and not compressed or buffered. The bitstreams from each receiver 404 may be passed to the digital decoder 406, which decodes the bitstream into its separate audio components. Any video data in the bitstream may be discarded by the decoder 406. The audio data may be then sent to the DSP 410 for further processing. In one embodiment, the decoder 406 may be implemented in an FPGA or ASIC.

The DSP 410 may select which portion of the audio data will be processed. In a stereo signal, a speaker will process either the left or right channel. In a surround sound signal, a speaker will select from among the multiple channels. The selection of what signal is used may be controlled through either some form of user or factory settable switch or jumper, or through a software configuration stored in non-volatile memory 412. The DSP 410 may filter the signal to correct the frequency response of the speaker 400. Then, it may break the equalized signal into signals tailored for individual transducers. This may be done by performing crossover, phase matching, and time alignment filtering function in a digital implementation. The filtering options available to a DSP processor may be far more numerous and more controllable than those available through analog filtering techniques. In one embodiment, the crossover filtering may be done using finite impulse response filters. In another embodiment, crossover filtering may be done using infinite impulse response (IIR) filters.

The output of the DSP 410 may be a set of digital signals, one for each of the speaker transducers 416*a-c*. These signals may be directed to the inputs of digital amplifiers 414*a-c*. In the conventional systems, typical speaker amplifiers receive analogue signals. In contrast, the amplifiers 414*a-c* may be designed to take digital audio input and generate high power output signals that drive the transducers 416*a-c* to produce an accurate reproduction of the original source material. In one embodiment, each of the amplifiers 414*a-c* may be a class D audio amplifier that may comprise one or more integrated and discrete circuits per transducer. In another embodiment, each of the amplifiers 414*a-c* may be a class A or A/B to have an analog format. In this embodiment, the loudspeaker 400 may optionally include D/A converter chip (DAC) 413*a-c* interposed between the DSP 410 and the amplifiers 414*a-c*, respectively. In still another embodiment, the transducers 416-*c* may be driven by a single integrated circuit. By eliminating the passive crossover and dedicating a separate digital amplifier to each transducer, a full-bandwidth discrete path is created all the way back to the digital source material.

In one embodiment of the present invention, the functions of DSP 410 may be integrated into the digital amplifiers 414*a-c*. The digital amplifiers 414*a-c* may be a single integrated circuit per channel, or could be a multi-channel amplifier, with or without DSP functions integrated.

A series of loudspeakers designed for specific applications such as Left and Right Channels, Center Channels, Surround Channels and Subwoofers can be used to capture the wireless digital audio data and convert it into sound pressure. In a preferred embodiment of the present invention, a loudspeaker cabinet may comprise an amplifier plate mounted on the back. This amp plate may hold the speaker's electronics. The plate may include a detachable power cord and a proprietary control input port 408. This control port 408 may be used during final assembly to program the DSP 410. During this final test procedure, a loudspeaker's characteristics may be measured and then corrected to match the desired final design standard. These corrections may be sent into the speaker 400 and stored in a non-volatile memory 412 by the speaker's DSP 410, via the control input port 408. This ensures that a speaker that leaves the production line is DSP-corrected to match the production standard.

Antennas 402*a-b* placed within or on the rear of the loudspeaker enclosure may capture the full-bandwidth digital audio broadcast from the controller 102. Digital wireless headphones 110 capable of receiving the full-bandwidth signal from the controller 102 may also be added to the system.

The wireless digital headphones 110 may be a subset of the wireless digital loudspeaker 400, where there are only two amplifiers and transducers, one for each side of the headset. Crossovers may not be required in this application, since only a single transducer may be used per channel.

Foregoing described embodiments of the invention are provided as illustrations and descriptions. They are not intended to limit the invention to precise form described. Other variations and embodiments are possible in light of above teachings, and it is thus intended that the scope of invention not be limited by this Detailed Description, but rather by Claims following.

What is claimed is:

1. A digital wireless audio and video playback system, comprising:

an audio-video signal controller comprising:

a video signal input for receiving a digital video signal;

an audio signal input for receiving a plurality of digital audio signals, each digital audio signal associated with an audio channel;

a digital signal processor coupled to receive the audio signals and process the audio input signals in the digital domain; and an encoder coupled to the digital signal processor and the video signal input to receive the digital video signal and to encode the digital video signal into digital video bitstream and further coupled to the digital signal processor to receive the audio signals, and to encode each audio signal into uncompressed digital audio bitstream;

an RF transmitter coupled to the encoder to receive the digital video bitstream and the plurality of digital audio bitstreams, modulate each digital bitstream into an assigned channel on a radio frequency (RF) digital broadcast signal and to transmit the digital broadcast signal to a plurality of receivers, to provide a point-to-multipoint transmission of the video signal and audio signals;

a wireless video receiver assigned to one of the channels of the digital broadcast signal, and comprising:

a first RF receiver to receive the digital broadcast signal for the digital video bitstream, and demodulate the broadcast signal to obtain the encoded digital video bitstream;

a video decoder coupled to the RF receiver to receive the encoded digital video bitstream, and to decode and output the digital video signal to a display device; and a plurality of wireless audio receivers, each audio receiver assigned to one of the channels of the digital broadcast signal, and comprising:

a second RF receiver to receive the digital audio broadcast signal and to demodulate the signal to obtain the encoded, uncompressed digital audio signal;

an audio decoder coupled to the RF receiver to receive the encoded digital audio signal to decode the digital audio signal;

a digital signal processor coupled to the decoder to process the digital audio signal in the digital domain; and at least one amplifier coupled to receiver and to amplify the audio signal, and provide an amplified analog audio signal to a loudspeaker.

2. The digital wireless audio and video playback apparatus of claim 1, wherein each wireless audio receiver further comprises:

a housing;

the wireless audio receiver contained inside the housing; and one or more loudspeakers coupled to the housing, and to the amplifier to output the audio signal.

3. The digital wireless audio and video playback apparatus of claim 1, wherein the amplifier is a class D amplifier.

4. The digital wireless audio and video playback apparatus of claim 1, wherein the digital broadcast signal is not compressed.

5. The digital wireless audio and video playback apparatus of claim 1, wherein the plurality of wireless audio receivers comprises:

a left channel receiver for receiving a digital audio signal assigned to a left audio channel;

a right channel receiver for receiving a digital audio signal assigned to a right audio channel; and a center channel receiver for receiving a digital audio signal assigned to a center audio channel.

6. The digital wireless audio and video playback apparatus of claim 5, wherein the plurality of wireless audio receivers comprises:

a plurality of surround speakers, each surround speaker assigned to one of the audio channels.

7. The digital wireless audio and video playback apparatus of claim 1, wherein the at least one amplifier of a wireless audio receiver includes a tweeter amplifier, and at least one of a midrange amplifier and woofer amplifier.

8. The digital wireless audio and video playback apparatus of claim 1, wherein the video receiver further comprises:

a video display for receiving the video signal and displaying an image; and at least two speakers coupled to the at least one amplifier for outputting the audio signals from at least two of the audio channels.

9. The digital wireless audio and video playback apparatus of claim 1, wherein the controller further comprises:

a microphone for obtaining an in-room response for each loudspeaker, and coupled to the digital signal processor for calculating a frequency response correction curve for each speaker based upon the obtained response of each loudspeaker.

10. The digital wireless audio and video playback apparatus of claim 1, wherein the controller further comprises:

a source selector to select from among the input digital signal from the one or more digital signals to provide to the digital signal processor.

* * * * *